United States Patent
Ivanov et al.

(10) Patent No.: US 10,338,981 B2
(45) Date of Patent: Jul. 2, 2019

(54) SYSTEMS AND METHODS TO FACILITATE INFRASTRUCTURE INSTALLATION CHECKS AND CORRECTIONS IN A DISTRIBUTED ENVIRONMENT

(71) Applicant: VMware, Inc., Palo Alto, CA (US)

(72) Inventors: Dimitar Ivanov, Sofia (BG); Anna Delcheva, Sofia (BG); Evgeny Aronov, Sofia (BG); Dimitar Hristov Barfonchovski, Sofia (BG)

(73) Assignee: VMware, Inc, Palo Alto, CA (US)

( * ) Notice: Subject to any disclaimer, the term of this patent is extended or adjusted under 35 U.S.C. 154(b) by 137 days.

(21) Appl. No.: 15/370,677

(22) Filed: Dec. 6, 2016

(65) Prior Publication Data
US 2018/0157550 A1    Jun. 7, 2018

(51) Int. Cl.
*G06F 11/07* (2006.01)
*H04L 12/24* (2006.01)
(Continued)

(52) U.S. Cl.
CPC .......... *G06F 11/0712* (2013.01); *G06F 8/61* (2013.01); *G06F 11/0751* (2013.01);
(Continued)

(58) Field of Classification Search
CPC .... G06F 11/0712; G06F 8/61; G06F 11/0793; G06F 11/0751; H04L 41/0806;
(Continued)

(56) References Cited

U.S. PATENT DOCUMENTS 8,739,257 B1    5/2014 Robinson
9,092,248 B1    7/2015 Makin et al.
(Continued)

OTHER PUBLICATIONS

United States Patent and Trademark Office, "Non-Final Office action," issued in connection with U.S. Appl. No. 15/370,569, dated Sep. 7, 2018, 21 pages.
(Continued)

*Primary Examiner* — Yolanda L Wilson
(74) *Attorney, Agent, or Firm* — Hanley, Flight and Zimmerman, LLC

(57) ABSTRACT

Methods and apparatus to facilitate infrastructure installation checks and corrections in a distributed environment are disclosed. An example apparatus includes a virtual appliance including a management endpoint. The example apparatus includes a component server including a management agent to communicate with the management endpoint. The virtual appliance is to assign a role to the component server and to determine a subset of prerequisites associated with the role based on an applicability to the role. Each of the subset of prerequisites is associated with an error correction script. The component server is to determine whether the component server satisfies the subset of prerequisites associated with the role. The component server is to address an error when the component server is determined not to satisfy at least one of the subset of prerequisites by executing the error correction script associated with the at least one of the subset of prerequisites.

20 Claims, 12 Drawing Sheets

(51) Int. Cl.
*H04L 29/08* (2006.01)
*G06F 8/61* (2018.01)

(52) U.S. Cl.
CPC ........ *G06F 11/0793* (2013.01); *H04L 41/046* (2013.01); *H04L 41/12* (2013.01); *H04L 67/34* (2013.01); *H04L 41/5096* (2013.01)

(58) Field of Classification Search
CPC . H04L 41/0866; H04L 41/0869; H04L 67/34; H04L 41/046; H04L 41/12
See application file for complete search history.

(56) References Cited

U.S. PATENT DOCUMENTS

| | | | |
|---|---|---|---|
| 9,152,446 | B2 | 10/2015 | Ansel |
| 9,386,079 | B2 * | 7/2016 | Ramalingam ........... H04L 67/10 |
| 9,471,474 | B2 * | 10/2016 | Gurumurthy ....... G06F 11/3688 |
| 9,773,122 | B2 * | 9/2017 | Betzler ..................... G06F 8/61 |
| 2008/0134176 | A1 * | 6/2008 | Fitzgerald ........... G06F 9/45537 |
| | | | 718/1 |
| 2010/0293409 | A1 * | 11/2010 | Machida ............. G06F 11/2038 |
| | | | 714/4.1 |
| 2011/0154320 | A1 | 6/2011 | Verma |
| 2011/0173605 | A1 * | 7/2011 | Bourne ..................... G06F 8/71 |
| | | | 717/176 |
| 2012/0054486 | A1 | 3/2012 | Lakkavalli et al. |
| 2012/0117381 | A1 | 5/2012 | Lo et al. |
| 2012/0233299 | A1 | 9/2012 | Attanasio et al. |
| 2013/0018994 | A1 * | 1/2013 | Flavel ................. H04L 41/0806 |
| | | | 709/220 |
| 2013/0232497 | A1 * | 9/2013 | Jalagam ................ G06F 9/5072 |
| | | | 718/104 |
| 2013/0247136 | A1 * | 9/2013 | Chieu ................... G06F 21/577 |
| | | | 726/1 |
| 2013/0297964 | A1 * | 11/2013 | Hegdal ............... G06F 11/0712 |
| | | | 714/2 |
| 2015/0052402 | A1 * | 2/2015 | Gurumurthy ....... G06F 11/3688 |
| | | | 714/38.1 |
| 2015/0074743 | A1 * | 3/2015 | Ilieva ...................... H04L 63/20 |
| | | | 726/1 |
| 2015/0180653 | A1 | 6/2015 | Nix |
| 2015/0215308 | A1 | 7/2015 | Manolov et al. |
| 2015/0222604 | A1 | 8/2015 | Ylonen |
| 2015/0312116 | A1 * | 10/2015 | Taheri ..................... H04L 67/10 |
| | | | 709/224 |
| 2015/0324182 | A1 * | 11/2015 | Barros ...................... G06F 8/61 |
| | | | 717/174 |
| 2015/0339113 | A1 | 11/2015 | Dorman et al. |
| 2015/0347264 | A1 * | 12/2015 | Mohammed ........ G06F 11/3476 |
| | | | 714/45 |
| 2015/0358392 | A1 * | 12/2015 | Ramalingam ........... H04L 67/10 |
| | | | 709/203 |
| 2016/0285832 | A1 | 9/2016 | Petrov et al. |
| 2017/0222981 | A1 | 8/2017 | Srivastav et al. |
| 2018/0159721 | A1 | 6/2018 | Delcheva et al. |
| 2018/0159844 | A1 | 6/2018 | Barfonchovski et al. |
| 2018/0159845 | A1 | 6/2018 | Aronov et al. |

OTHER PUBLICATIONS

United States Patent and Trademark Office, "Non-Final Office action," issued in connection with U.S. Appl. No. 15/370,626, dated Aug. 27, 2018, 55 pages.

United States Patent and Trademark Office, "Final Office action," issued in connection with U.S. Appl. No. 15/370,626, dated Jan. 4, 2019, 35 pages.

\* cited by examiner

_US 10,338,981 B2_

SYSTEMS AND METHODS TO FACILITATE INFRASTRUCTURE INSTALLATION CHECKS AND CORRECTIONS IN A DISTRIBUTED ENVIRONMENT

FIELD OF THE DISCLOSURE

The present disclosure relates generally to cloud computing and, more particularly, to methods and apparatus to facilitate infrastructure installation checks and corrections in a distributed environment such as a cloud computing environment.

BACKGROUND

Virtualizing computer systems provide benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

DETAILED DESCRIPTION

Figure 1:
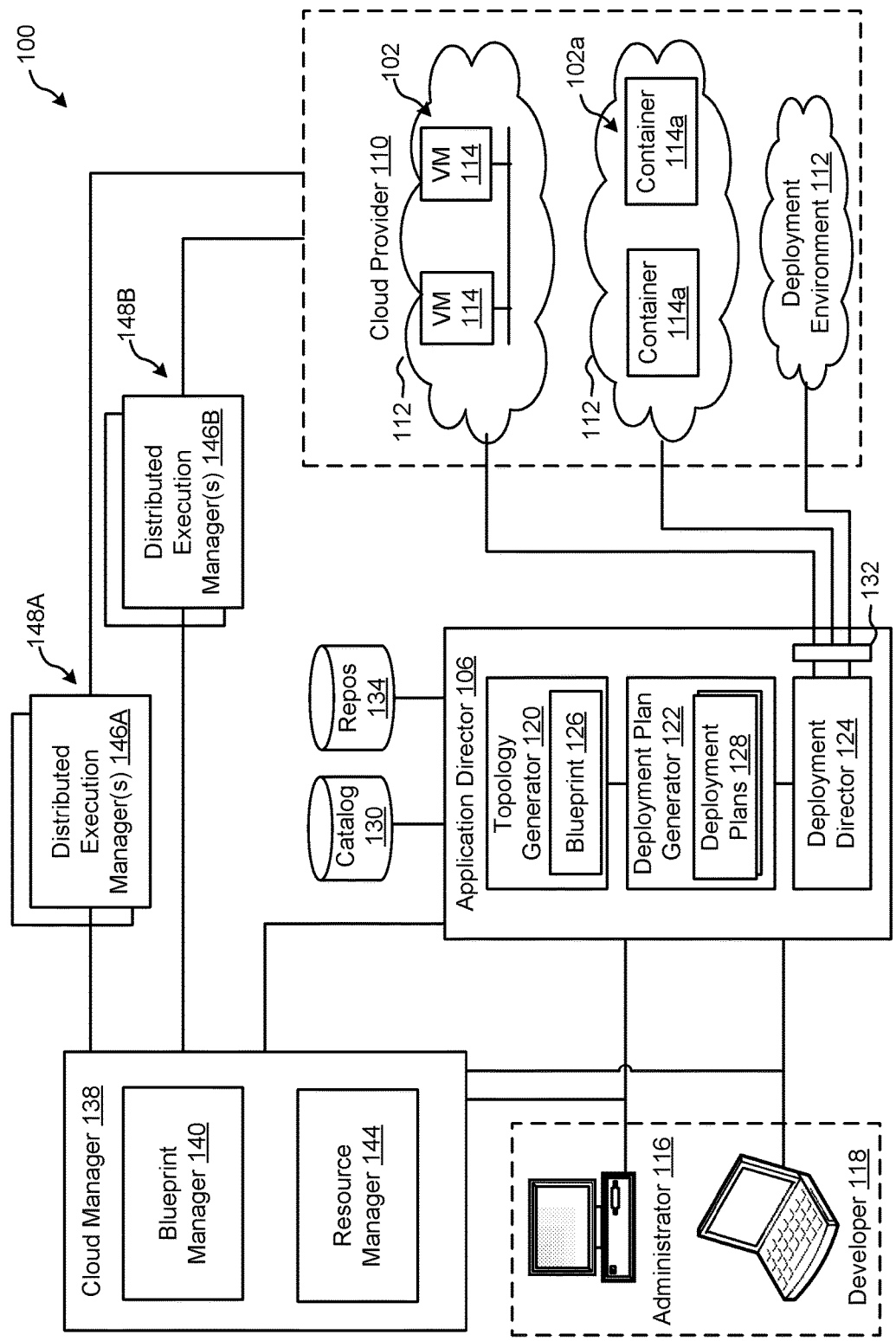
FIG. 1 depicts an example system constructed in accordance with the teachings of this disclosure for managing a cloud computing platform.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

Cloud computing platforms may provide many powerful capabilities for performing computing operations. However, taking advantage of these computing capabilities manually may be complex and/or require significant training and/or expertise. Prior techniques to providing cloud computing platforms and services often require customers to understand details and configurations of hardware and software resources to establish and configure the cloud computing platform. Methods and apparatus disclosed herein facilitate the management of virtual machine resources in cloud computing platforms.

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

As disclosed in detail herein, methods and apparatus disclosed herein provide for automation of management tasks such as provisioning multiple virtual machines for a multiple-machine computing system (e.g., a group of servers that inter-operate), linking provisioned virtual machines and tasks to desired systems to execute those virtual machines or tasks, and/or reclaiming cloud computing resources that are no longer in use. The improvements to cloud management systems (e.g., the vCloud Automation Center (vCAC) from VMware®, the vRealize Automation Cloud Automation Software from VMware®), interfaces, portals, etc. disclosed herein may be utilized individually and/or in any combination. For example, all or a subset of the described improvements may be utilized.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

Many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated the process from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

FIG. 1 depicts an example system 100 constructed in accordance with the teachings of this disclosure for managing a cloud computing platform. The example system 100 includes an application director 106 and a cloud manager 138 to manage a cloud computing platform provider 110 as described in more detail below. As described herein, the example system 100 facilitates management of the cloud provider 110 and does not include the cloud provider 110. Alternatively, the system 100 could be included in the cloud provider 110.

The cloud computing platform provider 110 provisions virtual computing resources (e.g., virtual machines, or "VMs," 114) that may be accessed by users of the cloud computing platform 110 (e.g., users associated with an administrator 116 and/or a developer 118) and/or other programs, software, device, etc.

An example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging, and/or production of applications. The administrator 116, the developer 118, other programs, and/or other devices may access services from the cloud computing platform provider 110, for example, via REST (Representational State Transfer) APIs (Application Programming Interface) and/or via any other client-server communication protocol. Example implementations of a REST API for cloud computing services include a vCloud Administrator Center™ (vCAC) and/or vRealize Automation™ (vRA) API and a vCloud Director™ API available from VMware, Inc. The example cloud computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112 of FIG. 1 is vCloud DataCenter cloud computing services available from VMware, Inc.

In some examples disclosed herein, a lighter-weight virtualization is employed by using containers in place of the VMs 114 in the development environment 112. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Also like virtual machines, the containers 114a can execute instances of applications or programs (e.g., an example application 102a) separate from application/program instances executed by the other containers in the same development environment 112.

The example application director 106 of FIG. 1, which may be running in one or more VMs, orchestrates deployment of multi-tier applications onto one of the example deployment environments 112. As illustrated in FIG. 1, the example application director 106 includes a topology generator 120, a deployment plan generator 122, and a deployment director 124.

The example topology generator 120 generates a basic blueprint 126 that specifies a logical topology of an application to be deployed. The example basic blueprint 126 generally captures the structure of an application as a collection of application components executing on virtual computing resources. For example, the basic blueprint 126 generated by the example topology generator 120 for an online store application may specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including one or more application packages and their dependent middleware and/or operating systems. Applications may be distributed across multiple VMs. Thus, in the example described above, the term "application" refers to the entire online store application, including application server and database components, rather than just the web application itself. In some instances, the application may include the underlying hardware and/or virtual computing hardware utilized to implement the components.

The example basic blueprint 126 of FIG. 1 may be assembled from items (e.g., templates) from a catalog 130, which is a listing of available virtual computing resources (e.g., VMs, networking, storage, etc.) that may be provisioned from the cloud computing platform provider 110 and available application components (e.g., software services, scripts, code components, application-specific packages) that may be installed on the provisioned virtual computing resources. The example catalog 130 may be pre-populated and/or customized by an administrator 116 (e.g., IT (Information Technology) or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the example application director 106 of FIG. 1 generates a deployment plan 128 based on the basic blueprint 126 that includes deployment settings for the basic blueprint 126 (e.g., virtual computing resources' cluster size, CPU, memory, networks, etc.) and an execution plan of tasks having a specified order in which virtual computing resources are provisioned and application components are installed, configured, and started. The example deployment plan 128 of FIG. 1 provides an IT administrator with a process-oriented view of the basic blueprint 126 that indicates discrete actions to be performed to deploy the application. Different deployment plans 128 may be generated from a single basic blueprint 126 to test prototypes (e.g., new application versions), to scale up and/or scale down deployments, and/or to deploy the application to different deployment environments 112 (e.g., testing, staging, production). The deployment plan 128 is separated and distributed as local deployment plans having a series of tasks to be executed by the VMs 114 provisioned from the deployment environment 112. Each VM 114 coordinates execution of each task with a centralized deployment module (e.g., the deployment director 124) to ensure that tasks are executed in an order that complies with dependencies specified in the application blueprint 126.

The example deployment director 124 of FIG. 1 executes the deployment plan 128 by communicating with the cloud computing platform provider 110 via a cloud interface 132 to provision and configure the VMs 114 in the deployment environment 112. The example cloud interface 132 of FIG. 1 provides a communication abstraction layer by which the application director 106 may communicate with a heterogeneous mixture of cloud provider 110 and deployment environments 112. The deployment director 124 provides each VM 114 with a series of tasks specific to the receiving VM 114 (herein referred to as a "local deployment plan"). Tasks are executed by the VMs 114 to install, configure, and/or start one or more application components. For example, a task may be a script that, when executed by a VM 114, causes the VM 114 to retrieve and install particular software packages from a central package repository 134. The example deployment director 124 coordinates with the VMs 114 to execute the tasks in an order that observes installation dependencies between VMs 114 according to the deployment plan 128. After the application has been deployed, the application director 106 may be utilized to monitor and/or modify (e.g., scale) the deployment.

The example cloud manager 138 of FIG. 1 interacts with the components of the system 100 (e.g., the application director 106 and the cloud provider 110) to facilitate the management of the resources of the cloud provider 110. The example cloud manager 138 includes a blueprint manager 140 to facilitate the creation and management of multi-machine blueprints and a resource manager 144 to reclaim unused cloud resources. The cloud manager 138 may additionally include other components for managing a cloud environment.

The example blueprint manager 140 of the illustrated example manages the creation of multi-machine blueprints that define the attributes of multiple virtual machines as a single group that can be provisioned, deployed, managed, etc. as a single unit. For example, a multi-machine blueprint may include definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine and/or container). Accordingly, the blueprint manager 140 facilitates more efficient management of multiple virtual machines and/or containers than manually managing (e.g., deploying) basic blueprints individually. Example management of multi-machine blueprints is described in further detail in conjunction with FIG. 2.

The example blueprint manager 140 of FIG. 1 additionally annotates basic blueprints and/or multi-machine blueprints to control how workflows associated with the basic blueprints and/or multi-machine blueprints are executed. As used herein, a workflow is a series of actions and decisions to be executed in a virtual computing platform. The example system 100 includes first and second distributed execution manager(s) (DEM(s)) 146A and 146B to execute workflows. According to the illustrated example, the first DEM 146A includes a first set of characteristics and is physically located at a first location 148A. The second DEM 146B includes a second set of characteristics and is physically located at a second location 148B. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, the example blueprint manager 140 annotates basic blueprints and/or multi-machine blueprints with capabilities that can be performed by a DEM that is labeled with the same or similar capabilities.

The resource manager 144 of the illustrated example facilitates recovery of cloud computing resources of the cloud provider 110 that are no longer being activity utilized. Automated reclamation may include identification, verification and/or reclamation of unused, underutilized, etc. resources to improve the efficiency of the running cloud infrastructure.

Figure 2:
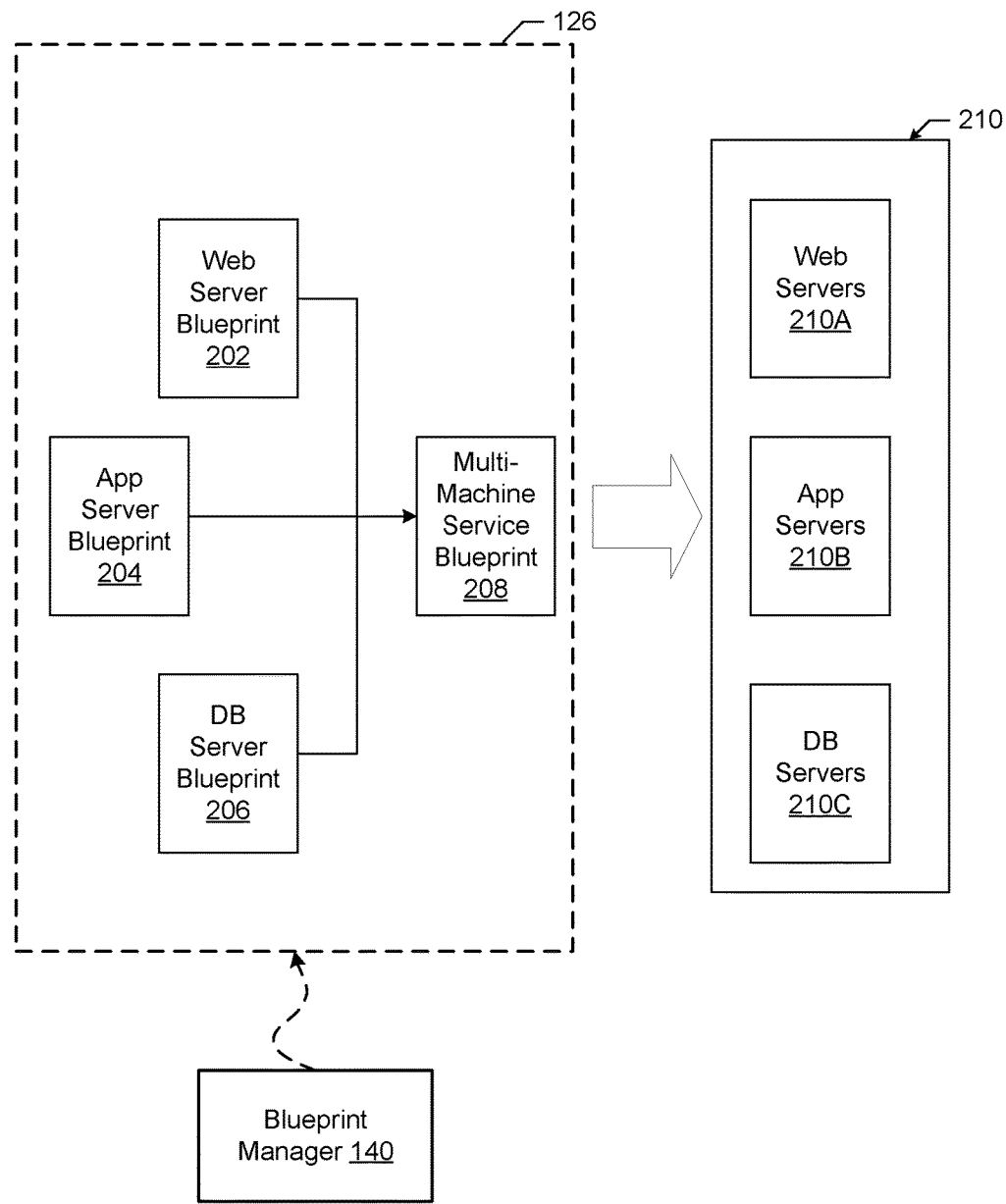
FIG. 2 illustrates an example generation of a multi-machine blueprint by the example blueprint manager of FIG. 1.

FIG. 2 illustrates an example implementation of the blueprint 126 as a multi-machine blueprint generated by the example blueprint manager 140 of FIG. 1. In the illustrated example of FIG. 2, three example basic blueprints (a web server blueprint 202, an application server blueprint 204, and a database (DB) server blueprint 206) have been created (e.g., by the topology generator 120). For example, the web server blueprint 202, the application server blueprint 204, and the database server blueprint 206 may define the components of an e-commerce online store.

The example blueprint manager 140 provides a user interface for a user of the blueprint manager 140 (e.g., the administrator 116, the developer 118, etc.) to specify blueprints (e.g., basic blueprints and/or multi-machine blueprints) to be assigned to an instance of a multi-machine blueprint 208. For example, the user interface may include a list of previously generated basic blueprints (e.g., the web server blueprint 202, the application server blueprint 204, the database server blueprint 206, etc.) to allow selection of desired blueprints. The blueprint manager 140 combines the selected blueprints into the definition of the multi-machine blueprint 208 and stores information about the blueprints in a multi-machine blueprint record defining the multi-machine blueprint 208. The blueprint manager 140 may additionally include a user interface to specify other characteristics corresponding to the multi-machine blueprint 208. For example, a creator of the multi-machine blueprint 208 may specify a minimum number and a maximum number of each blueprint component of the multi-machine blueprint 208 that may be provisioned during provisioning of the multi-machine blueprint 208.

Accordingly, any number of virtual machines (e.g., the virtual machines associated with the blueprints in the multi-machine blueprint 208) and/or containers may be managed collectively. For example, the multiple virtual machines corresponding to the multi-machine blueprint 208 may be provisioned based on an instruction to provision the multi-machine blueprint 208, may be power cycled by an instruction, may be shut down by an instruction, may be booted by an instruction, etc. As illustrated in FIG. 2, an instruction to provision the multi-machine blueprint 208 may result in the provisioning of a multi-machine service formed from one or more VMs 114 that includes virtualized web server(s) 210A, virtualized application server(s) 210B, and virtualized database server(s) 210C. The number of virtual machines and/or containers provisioned for each blueprint may be specified during the provisioning of the multi-machine blueprint 208 (e.g., subject to the limits specified during creation or management of the multi-machine blueprint 208).

The multi-machine blueprint 208 maintains the reference to the basic blueprints 202, 204, 206. Accordingly, changes made to the blueprints (e.g., by a manager of the blueprints different than the manager of the multi-machine blueprint 208) may be incorporated into future provisioning of the multi-machine blueprint 208. Accordingly, an administrator maintaining the source blueprints (e.g., an administrator charged with managing the web server blueprint 202) may change or update the source blueprint and the changes may be automatically propagated to the machines provisioned from the multi-machine blueprint 208. For example, if an operating system update is applied to a disk image referenced by the web server blueprint 202 (e.g., a disk image embodying the primary disk of the web server blueprint 202), the updated disk image is utilized when deploying the multi-machine blueprint. Additionally, the blueprints may specify that the machines 210A, 210B, 210C of the multi-machine service 210 provisioned from the multi-machine blueprint 208 operate in different environments. For example, some components may be physical machines, some may be on-premise virtual machines, and some may be virtual machines at a cloud service.

Several multi-machine blueprints may be generated to provide one or more varied or customized services. For example, if virtual machines deployed in the various States of the United States require different settings, a multi-machine blueprint could be generated for each state. The multi-machine blueprints could reference the same build profile and/or disk image, but may include different settings specific to each state. For example, the deployment workflow may include an operation to set a locality setting of an operating system to identify a particular state in which a resource is physically located. Thus, a single disk image may be utilized for multiple multi-machine blueprints reducing the amount of storage space for storing disk images compared with storing a disk image for each customized setting.

Figure 3:
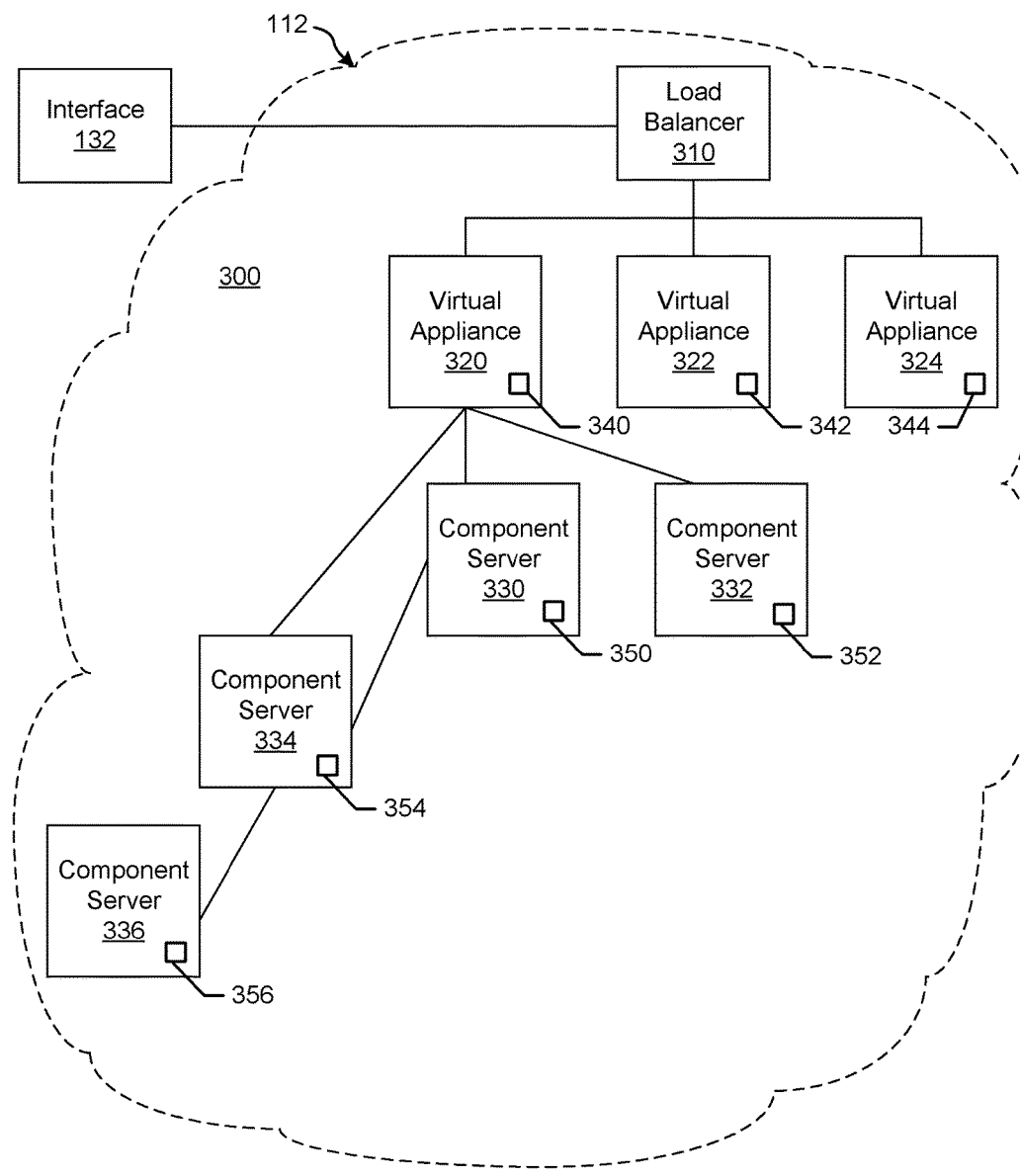
FIG. 3 illustrates an example installation of deployed virtual machines and associated servers acting as hosts for deployment of component servers for a customer.

FIG. 3 illustrates an example installation of deployed appliances or virtual appliances (vAs) (e.g., VMs 114 and/or containers 114a) and associated virtualized servers acting as hosts for deployment of component servers (e.g., Web server, application server, database server, etc.) for a customer. The vAs can be deployed as an automation tool, for example, used to deliver VMs and associated applications for on-premise automation and/or handling of external cloud resources (e.g., Microsoft Azure™, Amazon Web Services™, etc.).

As shown in the example of FIG. 3, an installation 300 includes a load balancer (LB) 310 to assign tasks and/or manage access among a plurality of vAs 320, 322, 324. Each vA 320-324 is a deployed VM 114 and/or container 114a. In this example, the vA 320 communicates with a plurality of component or host servers 330, 332, 334, 336 which store components for execution by users (e.g., Web server 210A with Web components, App server 210B with application components, DB server 210C with database components, etc.). As shown in the example of FIG. 3, component servers 334, 336 can stem from component server 330 rather than (or in addition to) directly from the virtual appliance 320, although the vA 320 can still communicate with such servers 334, 336. The LB 310 enables the multiple vAs 320-324 and multiple servers 330-336 to appear as one device to a user. Access to functionality can then be distributed among appliances 320-324 by the LB 310 and among servers 330-336 by the respective appliance 320, for example. The LB 310 can use least response time, round-robin, and/or other method to balance traffic to vAs 320-324 and servers 330-336, for example.

In the example installation 300, each vA 320, 322, 324 includes a management endpoint 340, 342, 344. Each component server 330, 332, 334, 336 includes a management agent 350, 352, 354, 356. The management agents 350-356 can communicate with their respective endpoint 340 to facilitate transfer of data, execution of tasks, etc., for example.

In certain examples, the management agents 350-356 synchronize component servers 330-336 with the vA 320-234 and facilitate host access and associated services (e.g., hostd, ntpd, sfcbd, slpd, wsman, vobd, etc.). The management agents 350-356 can communicate with their respective endpoint 340 to facilitate transfer of data, execution of tasks, etc., for example. The relationship between management endpoint 340, 342, 344 and associated management agents 350, 352, 354, 356 can be used to deploy and install software on multiple component machines 330, 332, 334, 336.

In certain examples, a graphical user interface associated with a front end of the load balancer 310 guides a customer through one or more questions to determine system requirements for the installation 300. Once the customer has completed the questionnaire and provided firewall access to install the agents 350-356, the agents 350-356 communicate with the endpoint 340 without customer involvement. Thus, for example, if a new employee needs a Microsoft Windows® machine, a manager selects an option (e.g., clicks a button, etc.) via the graphical user interface to install a VM 114 and/or container 114a that is managed through the installation 300. To the user, he or she is working on a single machine, but behind the scenes, the virtual appliance (vA) 320 is accessing different servers 330-336 depending upon what functionality is to be executed.

In certain examples, agents 350-356 are deployed in a same data center as the endpoint 340 to which the agents 350-356 are associated. The deployment can include a plurality of agent servers 330-336 distributed worldwide, and the deployment can be scalable to accommodate additional server(s) with agent(s) to increase throughput and concurrency, for example.

Figure 4A:
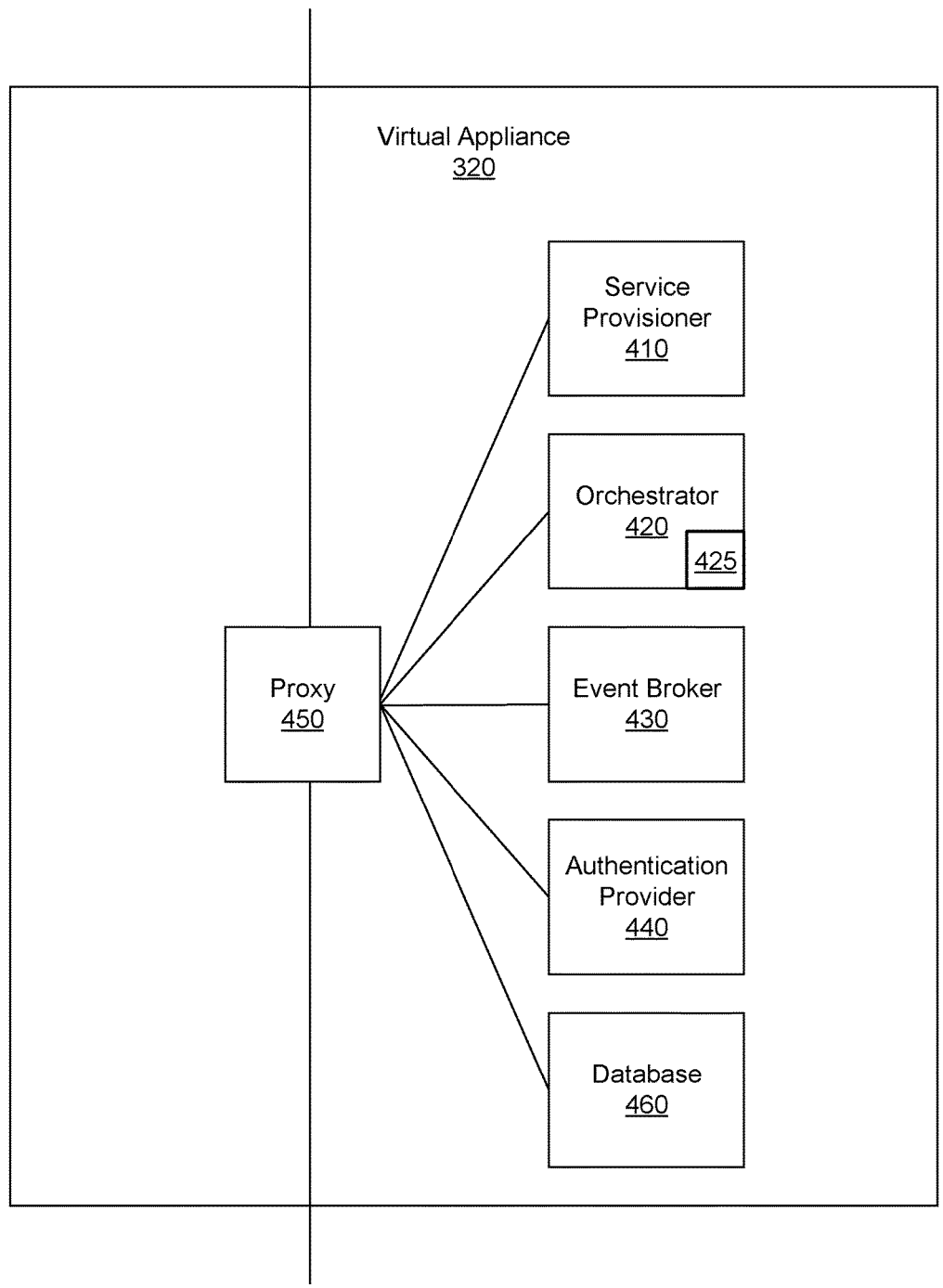
FIG. 4A illustrates an example implementation of a virtual appliance.

FIG. 4A illustrates an example implementation of the vA 320. In the example of FIG. 4A, the vA 320 includes a service provisioner 410, an orchestrator 420, an event broker 430, an authentication provider 440, an internal reverse proxy 450, and a database 460. The components 410, 420, 430, 440, 450, 460 of the vA 320 may be implemented by one or more of the VMs 114. The example service provisioner 410 provides services to provision interfaces (e.g., Web interface, application interface, etc.) for the vA 320. The example orchestrator (e.g., vCO) 420 is an embedded or internal orchestrator that can leverage a provisioning manager, such as the application director 106 and/or cloud manager 138, to provision VM services but is embedded in the vA 320. For example, the vCO 420 can be used to invoke a blueprint to provision a manager for services.

Example services can include catalog services, identity services, component registry services, event broker services, IaaS, XaaS, etc. Catalog services provide a user interface via which a user can request provisioning of different preset environments (e.g., a VM including an operating system and software and some customization, etc.), for example. Identity services facilitate authentication and authorization of users and assigned roles, for example. The component registry maintains information corresponding to installed and deployed services (e.g., uniform resource locators for services installed in a VM/vA, etc.), for example. The event broker provides a messaging broker for event-based communication, for example. The IaaS provisions one or more VMs and/or containers for a customer via the vA 320. The XaaS can extend the provisioning to also request, approve, provision, operate, and decommission any type of catalog items (e.g., storage, applications, accounts, and anything else that the catalog provides as a service).

In certain examples, the vCO 420 includes a prerequisite identifier 425 to identify role(s) for the component server(s) 330-336 and determine prerequisite(s) associated with the role(s). In other examples, the prerequisite identifier 425 is implemented via a backend of an installation wizard interface rather than or in addition to the vCO 420. The prerequisite identifier 425 can then trigger the vA 320 to instruct the component server(s) 330-336 to check the prerequisite(s) for each role assigned to the corresponding server 330-336.

The example event broker 430 provides a mechanism to handle tasks which are transferred between services with the orchestrator 420. The example authentication provider 440 (e.g., VMware Horizon™ services, etc.) authenticates access to services and data, for example.

The components of the vA 320 access each other through REST API calls behind the internal reverse proxy 450 (e.g., a high availability (HA) proxy HAProxy) which provides a high availability load balancer and proxy for Transmission Control Protocol (TCP)- and Hypertext Transfer Protocol (HTTP)-based application requests. In this example, the proxy 450 forwards communication traffic from within the vA 320 and/or between vAs 320, 322, 324 of FIG. 3 to the appropriate component(s) of the vA 320. In certain examples, services access the local host/proxy 450 on a particular port, and the call is masked by the proxy 450 and forwarded to the particular component of the vA 320. Since the call is masked by the proxy 450, components can be adjusted within the vA 320 without impacting outside users.

Example Infrastructure Installation

In certain examples, a cloud computing (e.g., vCAC™ vRA™ etc.) deployment includes one or more vAs 320-324 and one or more component servers 330-336 (e.g., Microsoft Windows™ machines, etc.) on which are installed components (e.g., software such as Web services, application services, database services, etc.) that form the IaaS portion of the product. In a distributed and/or high availability deployment, a plurality of component servers 330-336 form the installed product, and having to install the IaaS components manually on all of the component servers 330-336 is a time-consuming process, involving, among other things, multiple context switches and many opportunities for user misconfiguration of the deployed system. For example, manual installation involves installing components on an appliance, downloading an installer, and then visit each server to install the components manually using the installer. However, if a component is deployed out of order, the installation may not function. Additionally, data entry is required for each manual installation, and mis-typing of the manual data entry can invalidate the entire installation. Further, such a mistake may not be realized until the erroneous installation is deployed, resulting in lost time, money, errors, and inoperable systems. Simplification and automation of this process reduces the time needed and errors involved in setting up a new instance of the cloud computing system.

In certain examples, rather than requiring customers to manually install an IaaS component on each server 330-336, installation can be executed on each node from a centralized location via the management agent 350-356 installed on each component server 330-336. The agent 350-356 is installed and registered with the vA 320. After registration, communication with the vA 320 is authenticated using a self-signed certificate. The vA's 320 root credentials are not persisted on the server 330-336. Each instance of the management agent 350-356 has a node identifier (ID), which uniquely identifies the agent 330-336 in a cluster of machines 330-336 forming the cloud deployment. After registration, the agent 330-336 starts polling the vA 320 in a configurable time interval to obtain commands to be executed. The commands are executed by the corresponding server 330-336, and a result is reported back to the vA 320 by the agent 350-356 and can be used for further processing, for example.

In certain examples, installation of a hybrid system including a plurality of appliances 320-324 and component servers 330-336 having a plurality of roles can be orchestrated via the management agents 350-356. Using the management agents 350-356 in communication with the management endpoints 340-344 at their respective vAs 320-324, the example installation 300 can be coordinated without manual user action throughout phases of the installation.

Figure 4B:
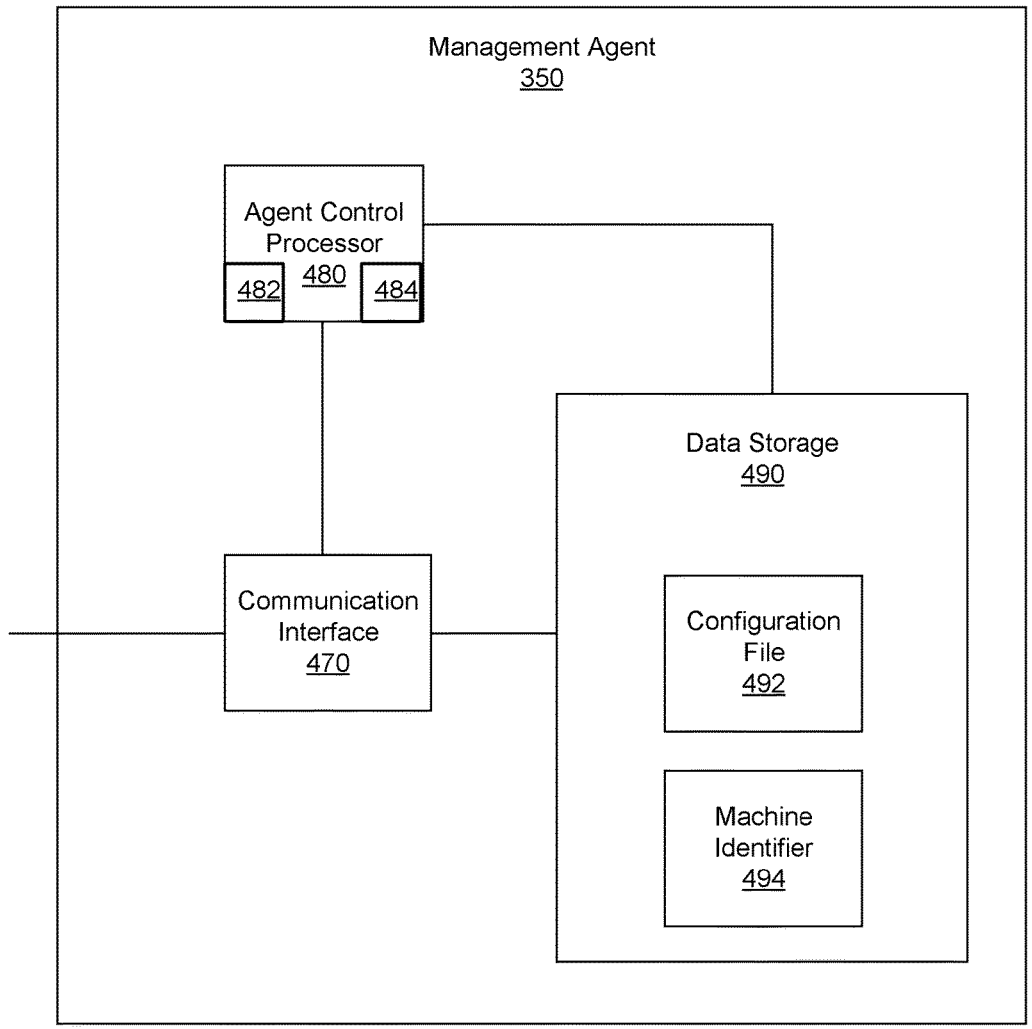
FIG. 4B illustrates a block diagram of an example implementation of a management agent.

FIG. 4B illustrates a block diagram of an example implementation of the management agent 350 (and/or 352, 354, 356). As shown in the example of FIG. 4B, the management agent 350 includes a communication interface 470 through which the agent 350 can communicate with the endpoint 340 (and/or 342, 344) of the vA 320 (and/or 322, 324). The communication interface 470 is a hardware and/or software interface allowing the agent 350 to exchange data, commands, etc., with the endpoint 340 and/or other communication node, for example.

The example agent 350 also includes an agent control processor 480. The agent control processor 480 executes instructions to control the agent 350 for command and/or other application execution, communication, storage, etc. The instructions can be transmitted to the agent control processor 480 via the communication interface 470 and/or via a data storage 490, for example.

The example data storage 490 includes a configuration file 492 and a machine identifier 494. The example configuration file 492 can include information such as credentials to authenticate and/or validate the agent 350 to the vA 320, etc. Credentials can include a certificate (e.g., with a public key and private key for authentication, etc.), a unique identifier, etc. The example agent control processor 480 can process instructions, generate communications, etc. The example data storage 490 can also include instructions (e.g., computer program code, etc.) to be executed by the agent control processor 480.

In certain examples, the agent control processor 480 includes a prerequisite checker 482 and a prerequisite fixer 484. The prerequisite checker 482 receives prerequisite information associated with one or more roles assigned to the server 330 from the vA 320 via the communication interface 470. The prerequisite checker 482 evaluates the server 330 to determine whether each rule and/or other requirement associated with each prerequisite is satisfied by the server 330. The prerequisite checker 482 logs each prerequisite that is not satisfied by the server 330. The prerequisite fixer 484 processes each logged error/failure and can correct (e.g., by executing one or more PowerShell scripts and/or other task automation/configuration management script or executable code executable to fix a prerequisite, etc.) the error/failure so that the server 330 then satisfies the prerequisite, for example.

Figure 5:
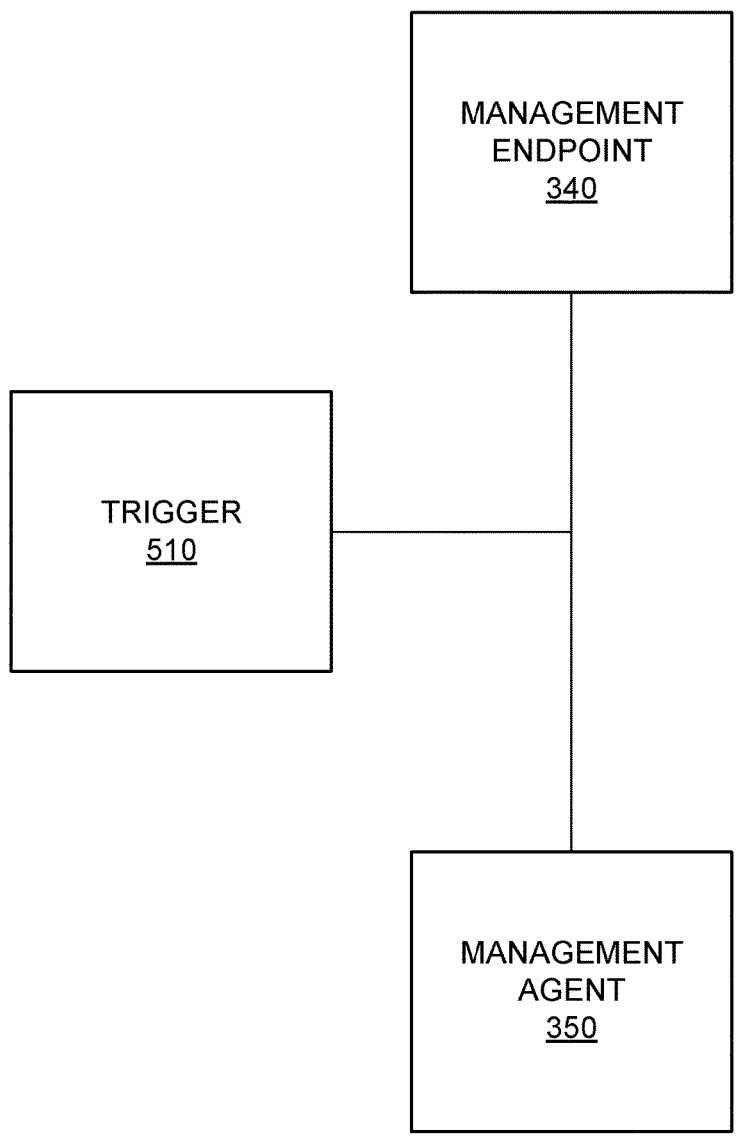
FIG. 5 illustrates an example system configuration in which the management endpoint and the management agent communicate with a trigger.

As shown in the example of FIG. 5, the management endpoint 340 and the management agent 350 communicate with a trigger 510. The trigger 510 can be a user, an automated script and/or other program, other external input, etc. The trigger 510 can initiate installation, deployment, and/or other action with respect to the vA 320 and/or the component server 330 via the endpoint 340 and agent 350. Similarly, the trigger 510 can initiate action with respect to other vA 322-324, component server 332-336, etc., via the endpoint 342-344, agent 352-356, etc.

In certain examples, a plurality of virtual appliances 320-324 are deployed with a plurality of component servers 330-336 serving different purposes. For example, each server 330-336 can be configured to provide a service such as a Web service (e.g., control web access, etc.), a manager service (e.g., control provisioning cycle and life cycle of each virtual machine, etc.), a database service, a distributed execution manager (DEM), an agent (e.g., a proxy agent connected to a hypervisor and/or hardware infrastructure to instantiate virtual machine(s), etc.), etc. The vA 320-324 are in the provider's (e.g., VMware, etc.) control, enabling the provider to have knowledge of the configuration, installation, etc., for each vA 320-324. With respect to the component servers 330-336, however, the customer often controls the servers so that the provider has little knowledge of each server 330-336. For example, the provider may be unaware of what software is installed on the server 330-336, version, etc. Rather, the provider knows some software is to be installed and security enabled on the server 330-336, for example.

In certain examples, the customer can specify which service(s) are to be installed on which server(s) 330-336. Before installation begins, the vA 320-324 help ensure that the server(s) will function for the component(s) to be installed. The vA 320-324 work to ensure that component(s) to be installed will function properly on the target server(s) 330-336 by executing loopback checks, confirm rule satisfaction, and/or other prerequisites.

If a server 330-336 is not compliant for the target software, then the server 330-336 can be made compliant. A problem that causes the server 330-336 to fail its prerequisites check can be identified and fixed. The fix can be automatic by the vA 320-324 and/or involve further effort to correct, for example. For example, if a loopback check is enabled, the problem can be fixed by stopping or disabling the check, etc.

Since the main appliance 320 may not be able to see the component server(s) 330-336, the vA 320 can communicate with the servers 330-336 through installation of the management agent 350-356, which can communicate with the management endpoint 340 of the vA 320. Rather than manually inspecting each server 330-336 and manually identifying and fixing any errors, the management agent 350-356 registers with the vA 320 during installation so that the vA 320 is aware of the agent 350-356 and can schedule work for the agent 350-356 and its server 330-336.

In certain examples, each agent 350-356 includes one or more programs (e.g., PowerShell scripts, etc.). In certain examples, a prerequisite check is linked with one or more PowerShell scripts (e.g., C#, etc.). Prerequisite checks can be validated using the script(s), for example, a Windows™ workflow activity can be associated with each service component (e.g., workflow Web, workflow manager service, etc.) that checks rules to validate. The workflow describes which checks apply to which role components. The vA 320 determines which roles are to be enabled on each node (each server 330-336), so each server 330-336 has a list of associated role(s). The management agent 350-356 receives a task instruction from the appliance 320 and starts to execute the task by running the workflow for the role (e.g., Web, manager, DEM, agent, etc.). Success or failure of task executed can be logged to generate a collection of outputs. Thus, the management agent 350-356 executes workflow(s) associated with component(s) to be installed on the server(s) 330-336, and a collection of output results.

In certain examples, the management agent 350-356 attempts to fix errors and/or other failures identified in a prerequisite check. For example, using PowerShell scripts and/or other script/executable code, each rule is associated with a first program code that checks the failure and a second program code that fixes the failure. For example, PowerShell scripts are embedded in a single command for each function, which provides a checker command and a fix command for each function. The management agent 350-356 reviews the results collection after a prerequisite check has been executed and, for each failed rule, identifies a PowerShell script that corresponds to the rule. The agent 350-356 then executes the code to fix the configuration to satisfy the rule. After error(s)/failure(s) have been remedied, the agent 350-356 generates a first command to the vA 320, and the vA 320 returns a second command to the management agent 350-356 to reboot the server 330-336, for example. In other examples, instructions to remedy a failure do not involve a reboot of the server 330-336.

Thus, in certain examples, the management agent 350-356 monitors execution of a command, detects an end of the command, and reports back to the vA 320. If the server 330-356 is rebooting, the management agent 350-356 exists in a persistent folder and looks for an instruction to reboot. While the server 330-336 is rebooting, no management agent 350-356 is active. However, once the server 330-336 has restarted, the management agent 350-356 detects that the server 330-336 has rebooted (e.g., checks last command executed and status, etc.) and reports back to the vA 320.

Figure 6A:
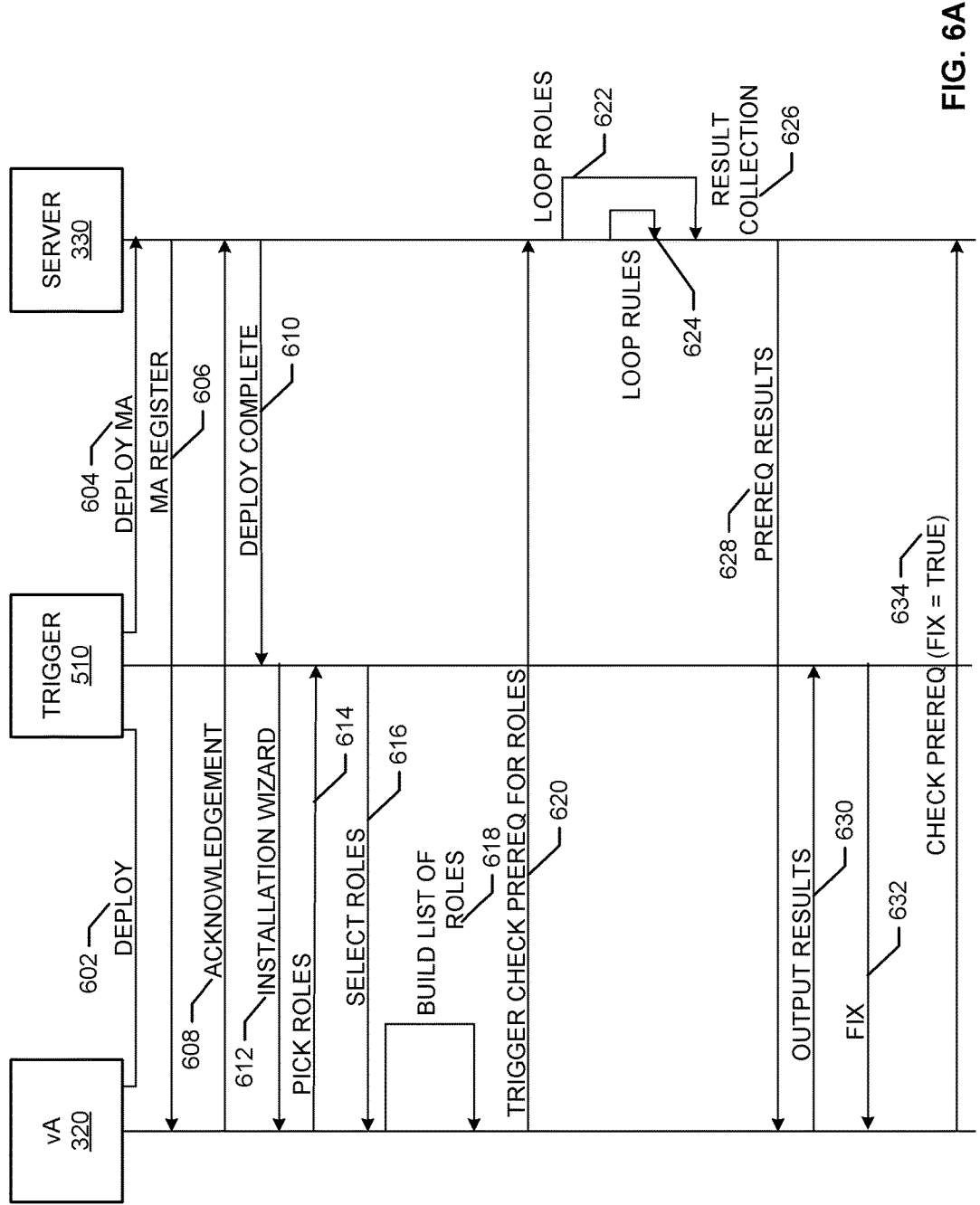
FIGS. 6A-6B illustrate example data flow diagrams showing an exchange of information between an appliance and a component server for installation.
Figure 6B:
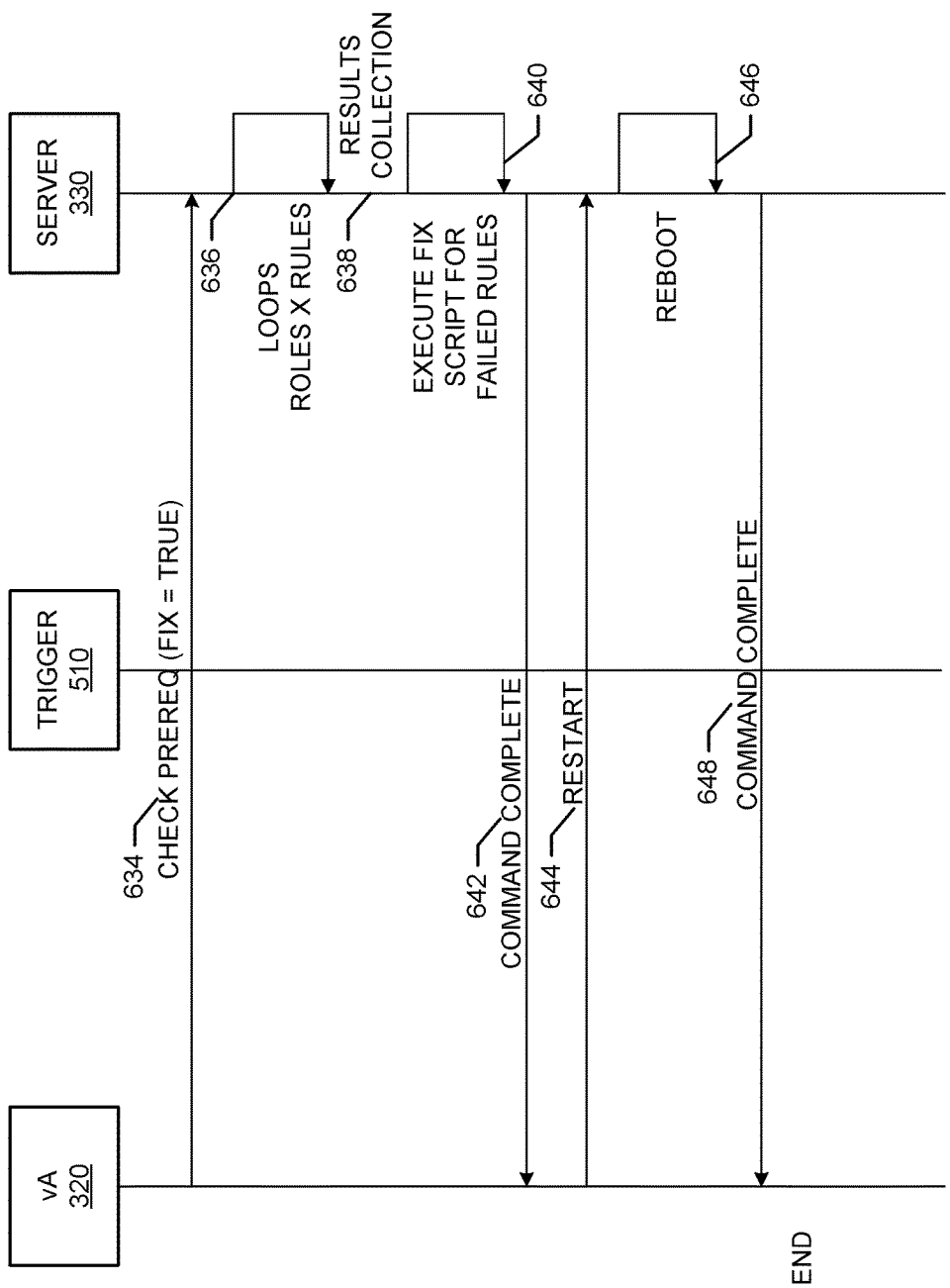

FIGS. 6A-6B illustrate example data flow diagrams showing an exchange of information 600 between the vA 320 and the component server 330 to install system 300 components including the vA 320 and component server 330 including management agent 350. While the example is described with respect to the vA 320, component server 330, and management agent 350, the exchange 600 can also occur with respect to vA 322, 324, component servers 332-336, management agents 352-356, etc.

As shown in the example of FIG. 6A, at 602, the trigger 510 (e.g., a user via a vA management webpage, an automated script, etc.) initiates deployment (e.g., via a wizard, automated script, etc.) of the vA 320. At 604, the trigger 510 initiates deployment (e.g., via a wizard, automated script, etc.) of the management agent 350 for the associated server 330. At 606, the management agent 350 registers with the vA 320. For example, registration includes an authentication of management agent 350 credentials by the vA 320, for example. Authentication and/or authorization can include an exchange and verification of a certificate, identifier, etc., associated with the management agent 350 and/or its associated server 330 by the vA 320, for example. In certain examples, registration includes authentication of the certificate (e.g., a self-signed certificate, third party certificate, etc.) as well as authorization of an identifier (e.g., a unique identifier such as a universally unique identifier (UUID) or globally unique identifier (GUID), other machine identifier, etc.) associated with the agent 350/server 300.

At 608, the vA 320 acknowledges the registration of the management agent 350. After a successful registration, the agent's certificate can be used to communicate with the vA 320 (e.g., the management endpoint 340 of the vA 320, etc.), and root credentials of the vA 320 do not persist on the server 330. For example, a cloud-based installation may include one or more vAs 320-324 and one or more servers 330-336 (e.g., "Windows™ machines", etc.) on which a plurality of components (e.g., five, six, seven, ten, etc.) are installed (e.g., applications, database, management, etc.) to form an IaaS in a distributed, high availability environment. The management agents 350-356 communicate with the management endpoint(s) 340-344 to receive commands, execute commands, install software, upgrade an installation at the server 330-336, etc.

Each management agent 350-356 has a node identifier (ID) that uniquely identifies the agent 350-356 in a cluster of machines 330-336 forming the system 300. When installing the agent 350-356, an address and root credentials of the primary vA 320 are entered so that the agent 350-356 can register itself in the vA 320. After the registration, communication with the vA 320 is authenticated using a self-signed certificate. In certain examples, since the self-signed certificate is used for communication between the agent 350-356 and the endpoint 340, the root credentials of the vA 320 are not persisted on the machines 330-336 after deployment is complete 610.

At 612, an installation wizard is triggered 510 for the vA 320 to determine role(s) for the server 330. For example, server 330 is assigned a role as a database server. Alternatively, the server 330 is assigned a role as a Web server. The server 330 may be assigned a role as an application server, for example. The server 330 may be assigned a role as a Windows™ server, for example.

Each role is associated with one or more rules that guide and/or establish criteria for the associated role. Each rule can be associated with one or more prerequisites for the server 330 to execute the rule and perform the role. In a high availability (HA) environment, rules may specify that there are at least two servers 330-336 for each role to provide redundancy and increased availability if one server 330 of a given role is busy or otherwise unavailable, for example.

At 614, available role(s) are provided to the trigger 510 from the vA 320. For example, the vA 320 determines role(s) based on installation configuration information, requirements, requests, server capability, and/or other constraint. At 616, the trigger 510 selects role(s) from the set of available role(s) provided by the vA 320. At 618, the vA 320 builds a list of role(s) to be assigned to the server 330 (and/or the servers 332-336) based on the selected role(s) and associated prerequisite information (e.g., rule(s), requirement(s), preference(s), etc.). For example, the prerequisite identifier 425 determines prerequisite(s) for the list of role(s).

At 620, the vA 320 triggers an evaluation or checking of prerequisite(s) for the selected role(s) to be assigned to the server 330 (and/or 332-336) to help ensure the associated server 330 can perform the role. For example, prerequisites can include a determination of whether the load balancer 310, vA 320-324, and/or component server 330-336, etc., is/are reachable (e.g., through a firewall, etc.). Another prerequisite can include registration of the server 330-336 and/or other IaaS node with the vA 320-324, for example. Another prerequisite can include database (e.g., object-relational database such as Postgres, etc.) access, for example.

At 622, the server 330 loops through the selected role(s). For each role, at 624, the prerequisite checker 482 of the server 330 loops through associated rule(s) (e.g., prerequisite(s)). The server 330 checks to determine whether each rule (e.g., each prerequisite) is satisfied by the server 330. For example, the server 330 checks to determine whether the server 330 can communicate through a firewall with the vA 320. The server 330 can check to determine whether the server 330 has processing, storage, and/or communication capabilities to function in a selected role, for example. The server 330 can check to determine whether it has proper permission/access to transmit, receive, and/or modify data according to a desired role, for example. A collection of results 626 is generated as rules are looped 624 for each role 622. At 628, results of the prerequisite analysis are sent by the server 330 to the vA 320. At 630, the results are output (e.g., displayed to a user, stored at the vA 320, transmitted to another device, etc.). At 632, a fix or correction of errors and/or other failed results is triggered 510. At 634, an instruction to check prerequisites is re-sent from the vA 320 to the server 330. However, this instruction includes a flag, parameter, or command to fix error(s) (e.g., fix=TRUE, etc.).

As shown in the example of FIG. 6B, after the instruction to fix 634 has been sent by the vA 320 to the server 330, at 636, the server 330 loops roles and rules to determine whether all rule(s) are satisfied for all role(s) at the server 330. Output (e.g., success, failure, error code, etc.) is captured by the server 330 in results collection 638. At 640, the server 330 (via the prerequisite fixer 484 and the management agent 350) executes one or more fix scripts (e.g., C# PowerShell scripts, etc.) to correct for failed rule(s) and/or other error identified in the results collection 638. For example, one or more automated scripts can be executed by the prerequisite fixer 484 to provide answer(s), setting(s), address(es), username(s), password(s), credential(s), communication port(s), etc., to satisfy missing prerequisite information for the server 330 at the vA 320.

At 642, once script execution is complete, the server 330 notifies the vA 320 of fix completion. At 644, the vA 320 instructs the server 330 (and its management agent 350) to restart. Rebooting or restarting 646 the server 330 and its management agent 350 causes the agent 350 and server 330 to restart their initialization sequence using the fixed and/or otherwise updated configuration (e.g., from execution of the one or more fix scripts, etc.). At 648, the server 330 notifies the vA 320 that the command execution has been completed.

In certain examples, each command has state machine including states for processing, complete, and failed. The management agent 350 controls the state of the command, and a timeout message can be generated to set a state of the command to failed. For example, if the command is sent and nothing happens for 30 minutes, the management agent 350 and/or management endpoint 340 can assume the command has failed and can resend the command.

In certain examples, the vA 320 validates the server 330. For example, the vA 320 sends one or more commands to the server 330 based on the role of the server 330 (e.g., install web service (validate=true), install manager service, etc.) to validate the installation and/or other configuration of the server 330. The server 330 returns an indication of whether or not the validation is okay (e.g., has been completed successfully, etc.). If the validation failed, fixing of prerequisites 634 can be repeated, for example. If validation is successful, then the installation, configuration, and validation process is complete. In certain examples, once prerequisite verification has completed, an install wizard can continue with other tasks.

Figure 7:
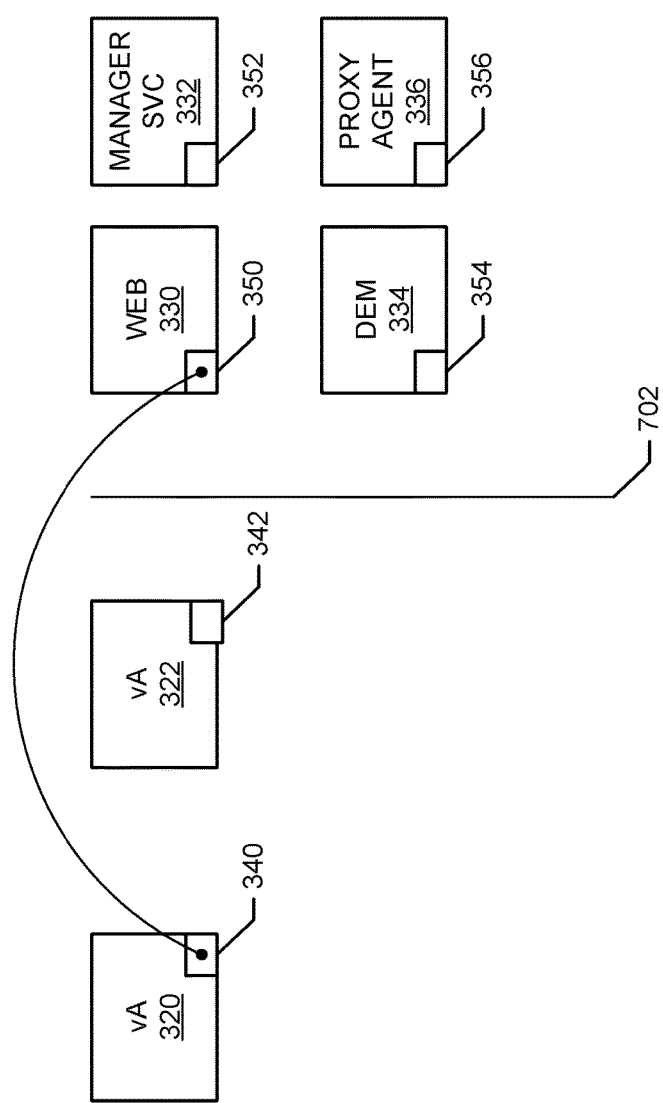
FIG. 7 illustrates an example configuration of services by a virtual appliance with respect to component servers across a firewall.

Thus, a sequence of commands is built and targeted for particular server(s) 330. The commands are triggered for orchestration of services via the management agent(s) 350. The central or primary vA 320 does not have access to individual nodes but instead accesses the management agent(s) 350-356 of the respective server(s) 330-336, which acts to execute installation instructions from the vA 320. The vA 320 awaits acknowledgement from the agent(s) 350-356. The server(s) 330-336 and associated agent(s) 350-356 can then be configured with services as illustrated in the example of FIG. 7. As shown in the example of FIG. 7, the vA 320 can configure Web, manager, DEM, and proxy agent services across a firewall 702 with respect to servers 330-336 and agents 350-356.

While example implementations of the example cloud computing system 100 and virtual machine installation 300 are illustrated in FIGS. 1-7, one or more of the elements, processes and/or devices illustrated in FIGS. 1-7 may be combined, divided, re-arranged, omitted, eliminated and/or implemented in any other way. Further, the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-7 can be implemented by hardware, software, firmware and/or any combination of hardware, software and/or firmware. Thus, for example, any of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-7 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-7 is/are hereby expressly defined to include a tangible computer readable storage device or storage disk such as a memory, a digital versatile disk (DVD), a compact disk (CD), a Blu-ray disk, etc. storing the software and/or firmware. Further still, the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-7 may include one or more elements, processes and/or devices in addition to, or instead of, those illustrated in FIGS. 1-7, and/or may include more than one of any or all of the illustrated elements, processes and devices.

Figure 8:
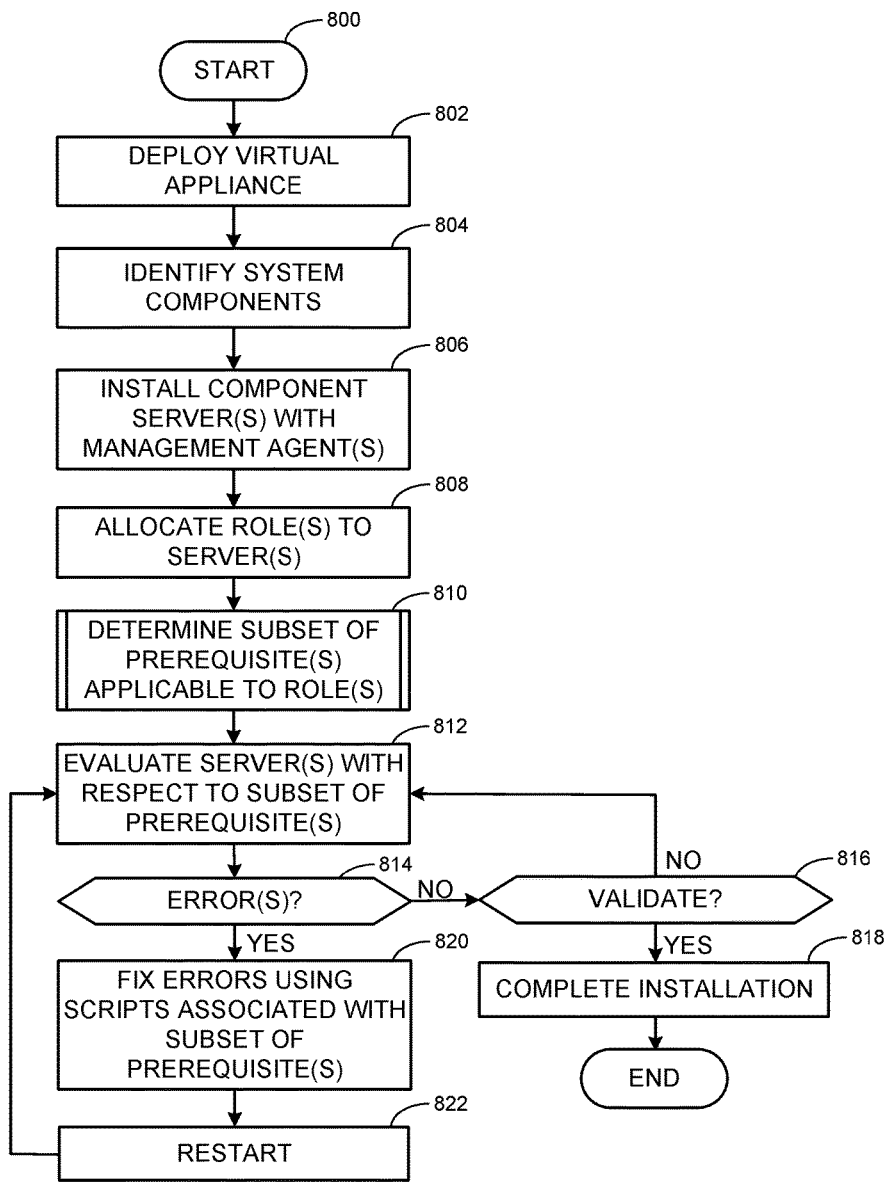
FIGS. 8-9 depict a flowcharts representative of computer readable instructions that may be executed to implement example infrastructure installation.
Figure 9:
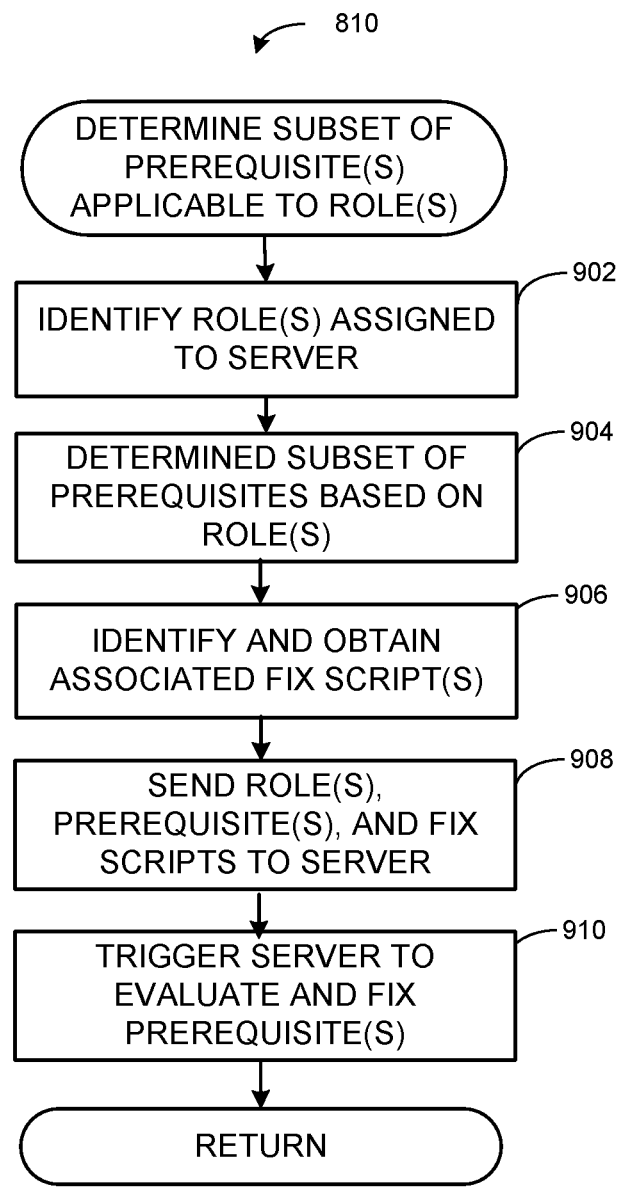

Flowcharts representative of example machine readable instructions that may be executed to deploy and manage the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-7 are shown in FIGS. 8-9. In these examples, the machine readable instructions implement programs for execution by a processor such as the processor 1012 shown in the example processor platform 1000 discussed below in connection with FIG. 10. The programs may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example programs are described with reference to the flowcharts illustrated in FIGS. 8-9, many other methods of deploying, evaluating, and installing services on component servers in accordance with the teachings of this disclosure may alternatively be used. For example, the order of execution of the blocks may be changed, and/or some of the blocks described may be changed, eliminated, or combined.

As mentioned above, the example processes of FIGS. 8-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example processes of FIGS. 8-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 8 depicts a flowchart representative of computer readable instructions that may be executed to implement the example infrastructure installation 300. An example program 800 is illustrated in FIG. 8. Initially, at block 802, the first, primary, or main vA 320 is deployed (e.g., triggered by a user, an automated script, an event, etc.). The installation wizard is also triggered to be run by the vA 320, for example.

At block 804, components in the system 300 are identified. For example, a cloud-based installation may include one or more vAs 320-324 and one or more servers 330-336 (e.g., "Windows™ machines", etc.) on which a plurality of components (e.g., five, six, seven, ten, etc.) are installed (e.g., applications, database, management, etc.) to form an IaaS in a distributed, high availability environment. The management agents 350-356 communicate with the management endpoint(s) 340-344 to receive commands, execute commands, install software, upgrade an installation at the server 330-336, etc. The system 300 can also include one or more devices such as a load balancer 310, etc.

At block 806, the management agent 350-356 is installed on each component server 330-336. Each server 330-336 acknowledges the installation of the management agent 350-356. The acknowledgement can include an authentication of management agent 350 credentials by the vA 320, for example. Authentication and/or authorization can include an exchange and verification of a certificate, identifier, etc., associated with the management agent 350 and/or its associated server 330 by the vA 320, for example.

In certain examples, each management agent 350-356 has a node identifier (ID) that uniquely identifies the agent 350-356 in a cluster of machines 330-336 forming the system 300. When installing the agent 350-356, an address and root credentials of the primary vA 320 are entered so that the agent 350-356 can register itself in the vA 320. After the registration, communication with the vA 320 is authenticated using a self-signed certificate. In certain examples, since the self-signed certificate is used for communication between the agent 350-356 and the endpoint 340, the root credentials of the vA 320 are not persisted on the machines 330-336.

At block 808, one or more roles are determined for each server 330 (and/or 332-336). For example, the server 330 is assigned a role as a database server. Alternatively, the server 330 is assigned a role as a Web server. The server 330 may be assigned a role as an application server, for example. The server 330 may be assigned a role as a Windows™ server, for example.

For example, the vA 320 determines role(s) based on installation configuration information, requirements, requests, preference, server capability, and/or other constraint. Role(s) can be selected from the set of available role(s) provided by the vA 320, for example. In certain examples, the vA 320 builds a list of role(s) to be assigned to the server 330 (and/or the servers 332-336) based on the selected role(s) and associated prerequisite information (e.g., rule(s), requirement(s), preference(s), etc.).

Each role is associated with one or more rules that guide and/or establish criteria for the associated role. Each rule can be associated with one or more prerequisites for a server 330-336 to execute the rule and perform the role. In a high availability (HA) environment, rules may specify that there are at least two servers 330-336 for each role to provide redundancy and increased availability if one server 330 of a given role is busy or otherwise unavailable, for example.

At block 810, the vA 320 (e.g., via the prerequisite identifier 425) determines applicable prerequisite(s) for a given role. The prerequisite(s) applicable to a particular server 330-336 for its assigned role(s) can be a subset of the total number of prerequisites available to be checked, for example. For example, for each role assigned to a server 330-336, the prerequisite identifier 425 of the vA 320 evaluates prerequisite(s) for that role and selects only the prerequisite(s) applicable to that role, rather than all prerequisites for all roles. Thus, rather than having each server 330-336 conduct prerequisite checks for all roles, each server 330-336 conducts prerequisite check(s) for rule(s) applying to the role(s) assigned to that particular server 330-336. By selectively narrowing the prerequisite check(s), the evaluation and correction process can be quicker and use fewer processing resources when compared to evaluating all rules for all roles via each server 330-336. The subset of prerequisites can be identified by identifying the IaaS component associated with an assigned role (e.g., database, website, manager service, etc.). After the component role has been identified, requirements for such a role are identified (e.g., an Internet Information Service (IIS) is to be installed before a Web site components can be installed on the server 330, etc.) by the prerequisite checker 482. Then, a prerequisite fix script to be executed to reconfigure the server 330-336 to fulfill the prerequisite check is obtained. For example, based on the role and associated check(s), the fix script is downloaded to the server 330-336 for execution by the prerequisite fixer 484.

At block 812, each server 330-336 evaluates or checks applicable subset of prerequisite(s) for the given role(s) to ensure the associated server 330-336 can perform the assigned role(s). For example, prerequisites can include a) a determination of whether the load balancer 310, vA 320-324, and/or component server 330-336, etc., is/are reachable; b) registration of the server 330-336 and/or other IaaS node with the vA 320-324; c) presence of a minimum software and/or firmware version; d) database (e.g., object-relational database such as Postgres, etc.) access; e) firewall access, etc. The prerequisite checker 482 evaluates each prerequisite with respect to the server 330-336 to determine whether the capability, configuration, etc., of the server 330-336 allow the server 330-336 to satisfy the prerequisite, for example.

At block 814, errors resulting from the prerequisite check(s) are identified at the server 330-336. For example, a prerequisite may not be satisfied and may need to be addressed before installation can continue. If no error is identified, then control advances to block 816 to validate the server 330-336 configuration, for example. For example, the vA 320 sends one or more commands to the server 330 based on the role of the server 330 (e.g., install web service (validate=true), install manager service, etc.) to validate the installation and/or other configuration of the server 330. The server 330 returns an indication of whether or not the validation is okay (e.g., has been completed successfully, etc.). If validation is successful, then, at block 818, installation is completed. Otherwise, evaluation returns to block 812.

When an error is identified, then, at block 820, the error is evaluated and one or more scripts associated with the failing prerequisite script are executed by the prerequisite fixer 484 to correct the error. For example, one or more automated scripts (e.g., PowerShell scripts, other script, other executable code, etc.) can be executed by the management agent 350-356 of the server 330-336 to provide answer(s), setting(s), address(es), password(s), credential(s), port identifier(s), etc., to satisfy missing prerequisite information for the server 330-336. At block 822, the server 330-336 is restarted after error correction script(s) have been executed. Control returns to block 812 to re-evaluate the server 330-336 with respect to the subset of applicable prerequisite(s).

FIG. 9 illustrates an example implementation of executing the installation at block 810 of the example flow diagram of FIG. 8 to determine an applicable subset of prerequisite(s) to match the role(s) of the server 330-336. At block 902, the role(s) assigned to the server 330-336 are identified. For example, the role(s) determined by the vA 320 for the server 330-336 are identified based on information from the vA 320.

At block 904, the subset of available prerequisites applicable to the particular role(s) for the server 330-336 are determined based on the assigned role(s). For example, for each role assigned to a server 330-336, the prerequisite identifier 425 of the vA 320 evaluates prerequisite(s) for that role and selects only the prerequisite(s) applicable to that role, rather than all prerequisites for all roles. Thus, rather than having each server 330-336 conduct prerequisite checks for all roles, each server 330-336 conducts prerequisite check(s) for rule(s) applying to the role(s) assigned to that particular server 330-336. By selectively narrowing the prerequisite check(s), the evaluation and correction process can be quicker and use fewer processing resources when compared to evaluating all rules for all roles via each server 330-336. The subset of prerequisites can be identified by identifying the IaaS component associated with an assigned role (e.g., database, website, manager service, etc.). After the component role has been identified, requirements (e.g., prerequisite(s), etc.) for such a role are identified (e.g., an Internet Information Service (IIS) is to be installed before a Website components can be installed on the server 330, etc.).

At block 906, one or more prerequisite fix script(s) associated with each of the subset of prerequisites are identified and obtained. The fix script(s) are to be executed to reconfigure the server 330-336 to fulfill the prerequisite check is obtained. For example, based on the role and associated check(s), the fix script is downloaded. At block 908, the role(s), subset of prerequisites, and associated fix script(s) are sent to the server 330-336. At block 910, the server 330-336 is triggered to evaluate and fix the prerequisite(s) for the role(s). Thus, the server 330-336 can focus on a subset of role(s), prerequisite(s), and fix(es) rather than evaluating all possible options.

Figure 10:
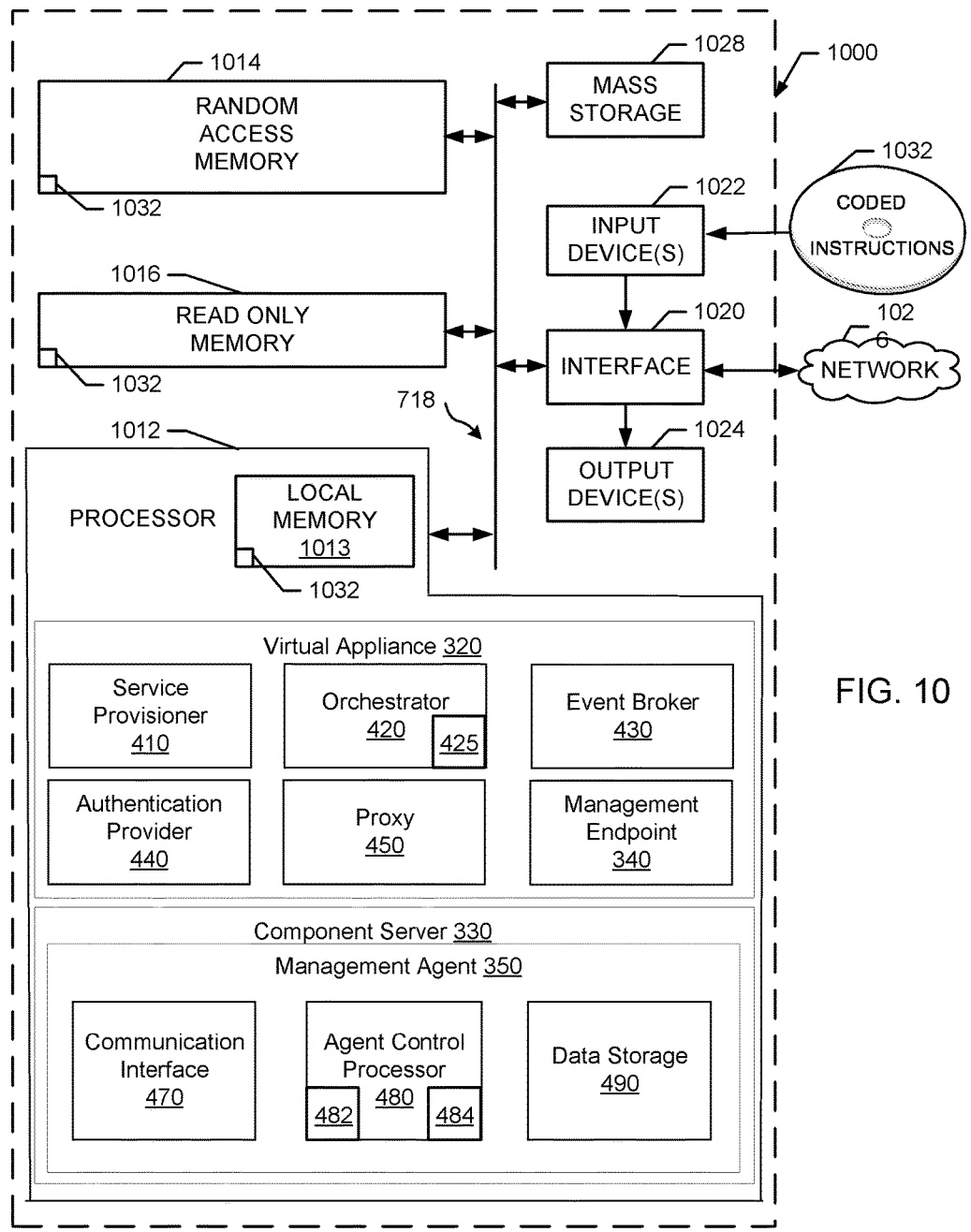
FIG. 10 is a block diagram of an example processing platform capable of executing the example machine-readable instructions of FIGS. 8-9.

FIG. 10 is a block diagram of an example processor platform 1000 capable of executing the instructions of FIGS. 8-9 to implement the example systems, operation, and management of FIGS. 1-7. The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache), and executes instructions to implement the example systems 100, 300 or portions thereof, such as the vA 320-324, component server 330-336, management endpoint 340-344, and management agent 350-356. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAIVIBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include flash devices, floppy disk drives, hard drive disks, optical compact disk (CD) drives, optical Blu-ray disk drives, RAID systems, and optical digital versatile disk (DVD) drives.

Coded instructions 1032 representative of the example machine readable instructions of FIGS. 8-9 may be stored in the mass storage device 1028, in the volatile memory 1014, in the non-volatile memory 1016, and/or on a removable tangible computer readable storage medium such as a CD or DVD.

In certain examples, the processor 1012 can be used to implement the virtual appliance 320 (and vAs 322-324) and the component server 330 (and servers 332-336) and their components including the service provisioner 410, orchestrator 420, prerequisite identifier 425, event broker 430, authentication provider 440, proxy 450, management endpoint 340, management agent 450, communication interface 470, agent control processor 480, prerequisite checker 482, prerequisite fixer 484, data storage 480, etc.

From the foregoing, it will be appreciated that the above disclosed methods, apparatus and articles of manufacture facilitate installation of a virtual appliance and associated component servers as an IaaS in a distributed environment such as a cloud computing environment and management of agents in the distributed environment. Examples disclosed herein facilitate self-evaluation and installation of servers and agents without further user intervention or cloud oversight.

As described above, rather than requiring customers to manually install the IaaS on each component server, the installation of each node can be facilitated from a centralized location via a management endpoint and management agents running on each component server. The management agents are registered with the virtual appliance, and further communication between the agent and the appliance is authenticated using a self-signed certificate. The appliance's root credentials are not persisted on the individual component servers. Each instance of the management agent has a node identifier, which uniquely identifies the node in the cluster of machines forming the infrastructure deployment. Prerequisite(s) can be more intelligently and automatically identified based on role(s) assigned to each server and associated management agent, and the server/agent can evaluate and fix only the subset of prerequisite(s) for applicable role(s) rather than all possible prerequisites. Automatically identifying and fixing prerequisite(s) not initially met by the server results in significantly improved accuracy and significantly reduced time, rather than requiring users to manually log onto each machine and fix each prerequisite that is not met. After registration and validation, the management agent starts polling the virtual appliance in configurable time for commands to be executed. The commands are executed by the server(s), and the result(s) is/are reported back to the virtual appliance and can be used for further processing.

Certain examples provide an apparatus including a first virtual appliance including a first management endpoint, the first virtual appliance to organize tasks to be executed to install a computing infrastructure. The example apparatus includes a first component server including a first management agent to communicate with the first management endpoint, the first virtual appliance to assign a first role to the first component server and to determine a subset of prerequisites associated with the first role, the subset of prerequisites selected from a plurality of prerequisites based on an applicability of the subset of prerequisites to the first role, each of the subset of prerequisites associated with an error correction script, the first component server to determine whether the first component server satisfies the subset of prerequisites associated with the first role, the first component server to address an error when the first component server is determined not to satisfy at least one of the subset of prerequisites by executing the error correction script associated with the at least one of the subset of prerequisites.

In certain examples, the first virtual appliance of the example apparatus is to build a list of roles and associated rules and wherein the first component server is to review the list of roles and execute the associated rules for each role in the list of roles to determine compliance with the subset of prerequisites for the first role and other roles in the list of roles.

In certain examples, the first component server of the example apparatus is to execute a second review of the list of roles based on an instruction from the first virtual appliance, the first component server to execute the error correction script associated with each prerequisite that is not satisfied by the first component server from the subset of prerequisites to bring the first component server into compliance with the respective prerequisite.

In certain examples, the error correction script of the example apparatus includes a PowerShell script.

In certain examples, each of the subset of prerequisites is associated with two scripts: a prerequisite check script and the error correction script.

In certain examples, the apparatus further includes a second component server associated with at least a second role and a second subset of prerequisites.

In certain examples, the first role includes at least one of a Web service role, a manager service role, a database role, a distributed execution manager role, or a proxy agent role.

Certain examples provide a method including deploying, by executing an instruction with at least one processor, a first virtual appliance, the first virtual appliance including a management endpoint, the first virtual appliance to organize tasks to be executed to install a computing infrastructure; installing, by executing an instruction with the at least one processor, a first component server including a first management agent to communicate with the first management endpoint; assigning, via the first virtual appliance by executing an instruction with the processor, a first role to the first component server; determining, by executing an instruction with the at least one processor, a subset of prerequisites associated with the first role, the subset of prerequisites selected from a plurality of prerequisites based on an applicability of the subset of prerequisites to the first role, each of the subset of prerequisites associated with an error correction script; determining, via the first component server by executing an instruction with the at least one processor, whether the first component server satisfies the subset of prerequisites associated with the first role; and addressing, via the first component server by executing an instruction with the at least one processor, an error when the first component server is determined not to satisfy at least one of the subset of prerequisites by executing the error correction script associated with the at least one of the subset of prerequisites.

In certain examples, the method includes building, via the first virtual appliance, a list of roles and associated rules; and reviewing, via the first component server, the list of roles and executing the associated rules for each role in the list of roles to determine compliance with the subset of prerequisites for the first role and other roles in the list of roles.

In certain examples, the method further includes executing, via the first component server, a second review of the list of roles based on an instruction from the first virtual appliance, the first component server to execute the error correction script associated with each prerequisite that is not satisfied by the first component server from the subset of prerequisites to bring the first component server into compliance with the respective prerequisite.

In certain examples, the error correction script includes a PowerShell script.

In certain examples, each of the subset of prerequisites is associated with two scripts: a prerequisite check script and the error correction script.

In certain examples, a second component server is associated with at least a second role and a second subset of prerequisites.

In certain examples, the first role includes at least one of a Web service role, a manager service role, a database role, a distributed execution manager role, or a proxy agent role.

Certain examples provide a computer readable storage medium including instructions that, when executed, cause a machine to at least: deploy a first virtual appliance, the first virtual appliance including a management endpoint, the first virtual appliance to organize tasks to be executed to install a computing infrastructure; install a first component server including a first management agent to communicate with the first management endpoint; assign, via the first virtual appliance, a first role to the first component server; determine a subset of prerequisites associated with the first role, the subset of prerequisites selected from a plurality of prerequisites based on an applicability of the subset of prerequisites to the first role, each of the subset of prerequisites associated with an error correction script; determine, via the first component server, whether the first component server satisfies the subset of prerequisites associated with the first role; and address, via the first component server, an error when the first component server is determined not to satisfy at least one of the subset of prerequisites by executing the error correction script associated with the at least one of the subset of prerequisites.

In certain examples, the instructions, when executed, further cause the machine to: build, via the first virtual appliance, a list of roles and associated rules; and review, via the first component server, through the list of roles and executing the associated rules for each role in the list of roles to determine compliance with the subset of prerequisites for the first role and other roles in the list of roles.

In certain examples, the instructions, when executed, further cause the machine to execute, via the first component server, a second review of the list of roles based on an instruction from the first virtual appliance, the first component server to execute the error correction script associated with each prerequisite that is not satisfied by the first component server from the subset of prerequisites to bring the first component server into compliance with the respective prerequisite.

In certain examples, each of the subset of prerequisites is associated with two scripts: a prerequisite check script and the error correction script.

In certain examples, the instructions, when executed, further install a second component server associated with at least a second role and a second subset of prerequisites.

In certain examples, the first role includes at least one of a Web service role, a manager service role, a database role, a distributed execution manager role, or a proxy agent role.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a first virtual appliance including a first management endpoint, the first virtual appliance to organize tasks to be executed to install a computing infrastructure; and
a first component server including a first management agent to communicate with the first management endpoint, the first virtual appliance to assign a first role to the first component server and to determine a subset of prerequisites associated with the first role, the subset of prerequisites selected from a plurality of prerequisites based on an applicability of the subset of prerequisites to the first role, each of the subset of prerequisites associated with an error correction script, the first component server to determine whether the first component server satisfies the subset of prerequisites associated with the first role, the first component server to address an error when the first component server is determined not to satisfy at least one of the subset of prerequisites by executing the error correction script associated with the at least one of the subset of prerequisites.

2. The apparatus of claim 1, wherein the first virtual appliance is to build a list of roles and associated rules and wherein the first component server is to review the list of roles and execute the associated rules for each role in the list of roles to determine compliance with the subset of prerequisites for the first role and other roles in the list of roles.

3. The apparatus of claim 2, wherein the first component server is to execute a second review of the list of roles based on an instruction from the first virtual appliance, the first component server to execute the error correction script associated with each prerequisite that is not satisfied by the first component server from the subset of prerequisites to bring the first component server into compliance with the respective prerequisite.

4. The apparatus of claim 1, wherein the error correction script includes a PowerShell script.

5. The apparatus of claim 1, wherein each of the subset of prerequisites is associated with two scripts: a prerequisite check script and the error correction script.

6. The apparatus of claim 1, further including a second component server associated with at least a second role and a second subset of prerequisites.

7. The apparatus of claim 1, wherein the first role includes at least one of a Web service role, a manager service role, a database role, a distributed execution manager role, or a proxy agent role.

8. A method comprising:
deploying, by executing an instruction with at least one processor, a first virtual appliance, the first virtual appliance including a first management endpoint, the first virtual appliance to organize tasks to be executed to install a computing infrastructure;
installing, by executing an instruction with the at least one processor, a first component server including a first management agent to communicate with the first management endpoint;
assigning, via the first virtual appliance by executing an instruction with the processor, a first role to the first component server;
determining, by executing an instruction with the at least one processor, a subset of prerequisites associated with the first role, the subset of prerequisites selected from a plurality of prerequisites based on an applicability of the subset of prerequisites to the first role, each of the subset of prerequisites associated with an error correction script;
determining, via the first component server by executing an instruction with the at least one processor, whether the first component server satisfies the subset of prerequisites associated with the first role; and
addressing, via the first component server by executing an instruction with the at least one processor, an error when the first component server is determined not to satisfy at least one of the subset of prerequisites by executing the error correction script associated with the at least one of the subset of prerequisites.

9. The method of claim 8, further including:
building, via the first virtual appliance, a list of roles and associated rules; and
reviewing, via the first component server, the list of roles and executing the associated rules for each role in the list of roles to determine compliance with the subset of prerequisites for the first role and other roles in the list of roles.

10. The method of claim 8, further including executing, via the first component server, a second review of the list of roles based on an instruction from the first virtual appliance, the first component server to execute the error correction script associated with each prerequisite that is not satisfied by the first component server from the subset of prerequisites to bring the first component server into compliance with the respective prerequisite.

11. The method of claim 8, wherein the error correction script includes a PowerShell script.

12. The method of claim 8, wherein each of the subset of prerequisites is associated with two scripts: a prerequisite check script and the error correction script.

13. The method of claim 8, further including a second component server associated with at least a second role and a second subset of prerequisites.

14. The method of claim 8, wherein the first role includes at least one of a Web service role, a manager service role, a database role, a distributed execution manager role, or a proxy agent role.

15. A computer readable storage medium comprising instructions that, when executed, cause a machine to at least:
deploy a first virtual appliance, the first virtual appliance including a first management endpoint, the first virtual appliance to organize tasks to be executed to install a computing infrastructure;
install a first component server including a first management agent to communicate with the first management endpoint;
assign, via the first virtual appliance, a first role to the first component server;
determine a subset of prerequisites associated with the first role, the subset of prerequisites selected from a plurality of prerequisites based on an applicability of the subset of prerequisites to the first role, each of the subset of prerequisites associated with an error correction script;

determine, via the first component server, whether the first component server satisfies the subset of prerequisites associated with the first role; and address, via the first component server, an error when the first component server is determined not to satisfy at least one of the subset of prerequisites by executing the error correction script associated with the at least one of the subset of prerequisites.

16. The storage medium of claim 15, wherein the instructions, when executed, further cause the machine to:

build, via the first virtual appliance, a list of roles and associated rules; and review, via the first component server, through the list of roles and executing the associated rules for each role in the list of roles to determine compliance with the subset of prerequisites for the first role and other roles in the list of roles.

17. The storage medium of claim 15, wherein the instructions, when executed, further cause the machine to execute, via the first component server, a second review of the list of roles based on an instruction from the first virtual appliance, the first component server to execute the error correction script associated with each prerequisite that is not satisfied by the first component server from the subset of prerequisites to bring the first component server into compliance with the respective prerequisite.

18. The storage medium of claim 15, wherein each of the subset of prerequisites is associated with two scripts: a prerequisite check script and the error correction script.

19. The storage medium of claim 15, wherein the instructions, when executed, further install a second component server associated with at least a second role and a second subset of prerequisites.

20. The storage medium of claim 15, wherein the first role includes at least one of a Web service role, a manager service role, a database role, a distributed execution manager role, or a proxy agent role.

* * * * *